(12) United States Patent
Jones

(10) Patent No.: US 6,755,451 B2
(45) Date of Patent: Jun. 29, 2004

(54) RECREATIONAL VEHICLE BUMPER DEVICE

(76) Inventor: Mark L. Jones, 14 Morgan Dr., Bow, NH (US) 03304

(*) Notice: Subject to any disclaimer, the term of this patent is extended or adjusted under 35 U.S.C. 154(b) by 0 days.

(21) Appl. No.: 10/154,345

(22) Filed: May 23, 2002

(65) Prior Publication Data

US 2003/0218342 A1 Nov. 27, 2003

(51) Int. Cl.⁷ .............................................. B60R 19/48
(52) U.S. Cl. ...................................................... 293/117
(58) Field of Search ......................................... 293/117

(56) References Cited

U.S. PATENT DOCUMENTS

| | | | |
|---|---|---|---|
| 4,234,222 A | 11/1980 | Bays | |
| 4,643,229 A | 2/1987 | Hickin | |
| 4,674,933 A * | 6/1987 | Brown | ........................ 293/122 |
| 4,678,011 A * | 7/1987 | Weber | |
| 4,732,421 A | 3/1988 | Ross et al. | |
| 4,838,315 A * | 6/1989 | Gunn | ........................ 137/899.3 |
| 4,854,349 A * | 8/1989 | Foreman | |
| 4,979,843 A * | 12/1990 | Perry | ........................ 293/106 |
| 5,106,136 A | 4/1992 | Crain | |
| 5,518,283 A | 5/1996 | Egelske | |
| 5,678,882 A | 10/1997 | Hammond | |
| 5,902,003 A | 5/1999 | Hindson | |
| 6,003,819 A * | 12/1999 | Hall | |
| 6,223,767 B1 * | 5/2001 | Otis | |

* cited by examiner

Primary Examiner—Lori L. Coletta
(74) Attorney, Agent, or Firm—Robert R. Deleault, Esq.; Mesmer & Deleault, PLLC

(57) ABSTRACT

The recreational vehicle bumper device is an elongated tube having an outside, cross-sectional shape sized smaller than the inside cross-sectional shape of a recreational vehicle's bumper where the elongated tube fits inside the recreational vehicle bumper, and having an inside diameter sized large enough to receive and store a recreational vehicle's waste disposal hose.

21 Claims, 2 Drawing Sheets

RECREATIONAL VEHICLE BUMPER DEVICE

BACKGROUND OF THE INVENTION

1. Field of the Invention

The present invention relates generally to recreational vehicles. Particularly, the present invention relates to the bumpers of recreational vehicles. More particularly, the present invention relates to the bumpers of recreational vehicles used for storing a sewage disposal hose.

2. Description of the Prior Art

Recreational vehicles, otherwise known as RVs, are in widespread use and come in a variety of shapes and sizes. Several different types of RVs include motor homes, campers and various types of trailers. RVs generally incorporate many modern-day conveniences such as running water, showers, toilet facilities, and cooking facilities. The discharge or waste from these conveniences is usually received and retained in a self-contained holding tank in the vehicle. When the vehicle is in a camp or park, the holding tank is typically connected directly to a sewer or a dump tank to transfer accumulated waste as it is produced. A flexible sewer or discharge hose having a quick connect coupling at one end is usually secured to a waste connection on the vehicle to act as the conduit between the holding tank and the sewer. Such a hose is generally stretchable and may be about 4 to 6 feet long when relaxed and stretchable to about 10 to 12 feet.

The hose construction most commonly utilized is in the form of a pleated plastic tube. The tube is generally made of a vinyl polymer or the like and reinforced by a wire spring embedded or attached to the pleats. This permits the hose to be stretched for discharge or collapsed for storage. The most commonly used type of hose for this purpose consists of a lightweight plastic sleeve reinforced with a lightweight spring having a low degree of resilience. In use, the hose frequently rests at least partially on the ground when it is inserted into the sewage dump and connected to the RV sewage disposal outlet. When not in use, the hose is typically stored inside the back bumper of the RV. The back bumper of the RV is typically a hollow tube made of metal and having a square or rectangular cross-section.

Over time, a serious problem often arises with the use of such a hose. When in use, the hose is exposed to the weather and, oftentimes, is wet from rain or dew. Further, when preparing to store the discharge hose, the ends of the hose that connect to the sewage dump and the vehicle's waste connection are typically rinsed with water to remove any dirt and other waste fluids. The wet hose is then stored inside of the rear bumper. The moisture within the bumper causes the metal bumper to corrode from the inside out. Because the corrosion occurs on the inside of the bumper, the corrosion generally goes unnoticed until it is too late. The result is the need to replace the rear metal bumper of the RV, which typically costs in excess of $400 installed.

Another problem that exists is the wear and tear on the discharge hose. The RV bumper typically has an uneven and coarse interior surface. Frequent insertion and removal of the discharge hose causes premature tearing of the discharge hose caused by the bumper's coarse interior surface.

Therefore, what is needed is a device that reduces the likelihood of corrosion from occurring within the inside of a RV bumper. What is further needed is a device that is relatively inexpensive and easy to manufacture. What is also needed is a device that is lightweight and noncorrodable. What is still needed is a device that extends the useful life of the discharge hoses.

SUMMARY OF THE INVENTION

It is an object of the present invention to provide a device that is noncorrodable, lightweight and reduces the likelihood of corrosion of a RV bumper from the inside out caused by the storing of a RV disposal hose. It is another object of the present invention to help protect the discharge hose from wear and tear caused by the uneven and coarse interior surface of a RV bumper as a result of frequent insertion and removal from the RV bumper.

The present invention achieves these and other objectives by providing an elongated tube constructed to fit inside a RV bumper and to receive the flexible sewage disposal hose of the RV. The elongated tube typically has a square or rectangular cross-section. The tube is generally sized to fit within the RV bumper and is typically about the length of the RV bumper. The tube is generally made of a noncorrodable material such as plastic, galvanized metal or other composite material and has a substantial portion of its surface without apertures, i.e. air holes or drainage holes. The ends of the tube may include customized end caps or have openings in the tube's side walls sized to align with the corresponding openings in the side walls of the RV bumper for receiving currently available bumper caps.

The present invention may be cast, mold injected, extruded, or assembled. Use of the present invention is relatively simple. The elongated tube is inserted in either end of the RV bumper until positioned within the bumper. The flexible, sewage discharge hose is then inserted and stored within the elongated tube. The elongated tube creates a waterproof layer between the discharge hose and the inside wall of the RV bumper as well as a smooth, continuous interior surface to accept discharge hoses without causing damage.

DETAILED DESCRIPTION OF THE PREFERRED EMBODIMENT

Figure 1:
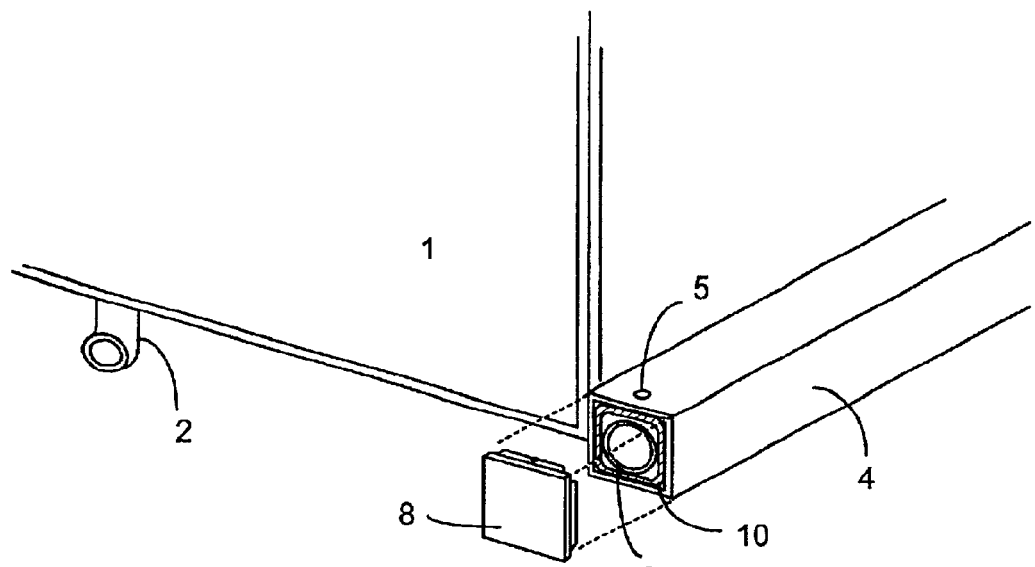
FIG. 1 is a partial perspective view of the present invention inserted within the bumper of a recreational vehicle.

The preferred embodiment of the present invention is illustrated in FIGS. 1–4. FIG. 1 illustrates a partial view of a rear corner of a recreational vehicle (RV) 1. RV 1 typically includes a waste disposal outlet 2 and a hose storage bumper 4. Hose storage bumper 4 optionally has a through hole 5 through the top and bottom of bumper 4 spaced a short distance from each end. A tube 10 of the present invention is shown inserted within bumper 4 and stores disposable hose 6 when not in use. Optionally, to help retain hose 6 within bumper 4, a bumper end cap 8 is attached to each end of bumper 4. End cap 8 may have a protrusion 8a on the outside surface of an upper and lower portion sized to fit into bumper hole 5.

Hose 6 generally consists of lightweight plastic material such as polyvinyl chloride reinforced internally with a light wire spring and having an inside diameter of about 3 inches more or less. The construction is usually such that it can be compressed for storage with a compressed length of from about 2–4 feet and extendible to about 10–12 feet in use.

Hose 6 may get wet during use and, consequently, is stored within bumper 4 in a wet condition. The moisture causes bumper 4 to corrode from the inside out, such corrosion going unnoticed until the corrosion has progressed to a point where replacement of bumper 4 is required. Replacement of bumper 4 is expensive and may typically cost in excess of $400 installed. In addition, the inside surface of RV bumper 4 is typically uneven, coarse and rough. This rough surface increases the likelihood of tearing hose 6 as it is frequently inserted and withdrawn from bumper 4 causing premature failure of hose 6.

Tube 10 of the present invention is made of a noncorrodable material such as plastic, galvanized metal or other composite material. Plastics may be thermoset, thermoplastic or elastomer. Examples of thermoset materials are polyurethane, polyester and epoxy. Examples of thermoplastic materials are polyethylene, polypropylene, polyvinyl chloride, polystyrene, acrylic, nylon, fiberglass, fluorocarbon, and the like. Preferably, tube 10 is made from polyethylene.

Figure 2:
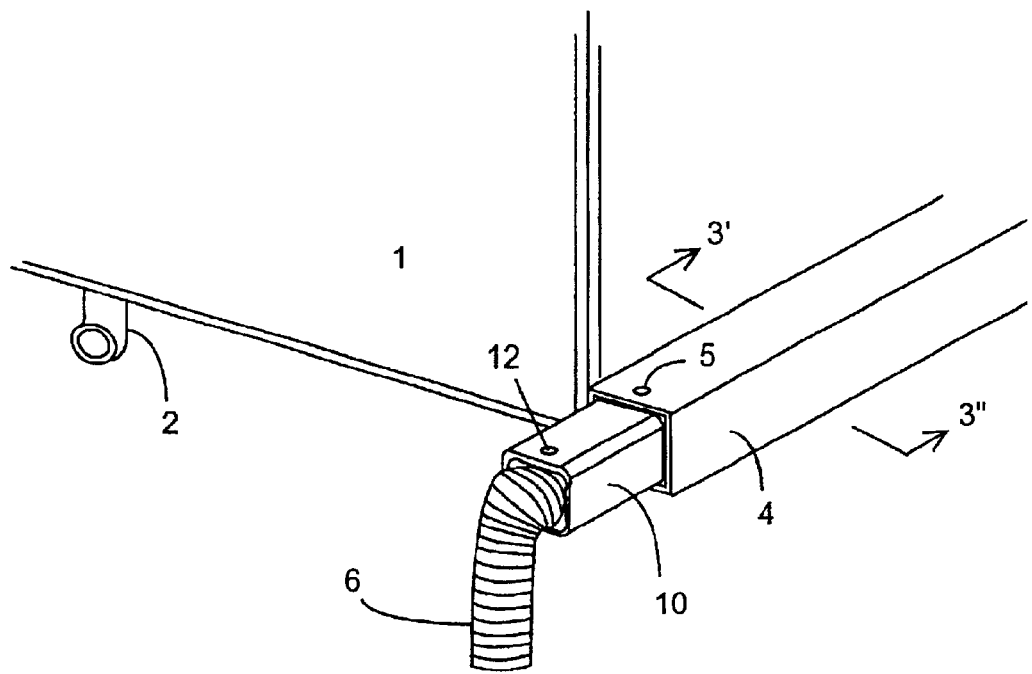
FIG. 2 is a partial perspective view of the present invention extended from the bumper of a recreational vehicle.

Turning now to FIG. 2, there is shown tube 10 of the present invention telescopically extended from bumper 4 to better show the relationship of bumper 4, tube 10 and hose 6. Tube 10 optionally includes a through hole 12 on opposing walls sized and positioned to align with bumper through hole 5 for receiving protrusion 8a of end cap 8. The length of tube 10 may also be sized to allow tube 10 to be recessed just beyond through hole 5 from each end of bumper 4. In this way, end caps designed for fitting the ends of bumper 4 may still be accommodated without the need to purchase new end caps specially designed to account for the smaller end dimensions of tube 10.

Figure 3:
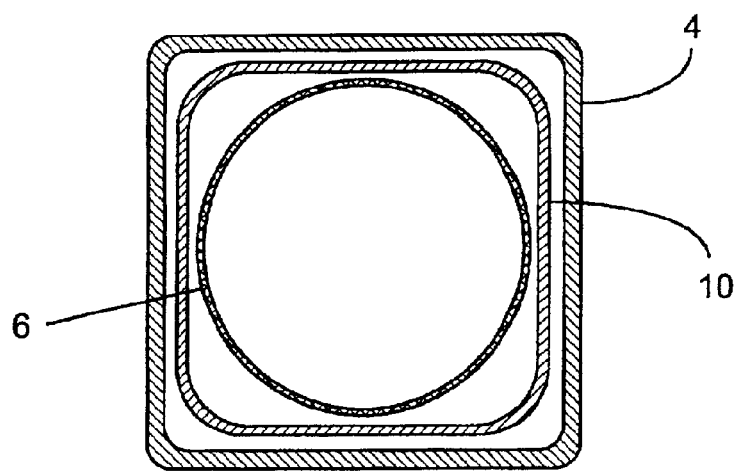
FIG. 3 is a cross-sectional view of the bumper in FIG. 2 taken along lines 3'–3".

FIG. 3 is a cross-sectional view of the present invention taken along plane 3'–3" in FIG. 2. As can be seen, tube 10 is inserted within bumper 4 and sized to receive hose 6. Preferably, tube 10 is made of polyethylene having a square, tubular shape with an internal diameter of about 3.5 inches and a wall thickness of about 0.062 inches. The square cross-section preferably has corners with a 1-inch radius. The 1-inch radius corners allows for a larger air-gap along the four internal corners of bumper 4, which enhances ventilation and evaporation of moisture that may occur such as from condensation. Tube 10 is preferably about the same length as that of bumper 4 in order to reduce the likelihood of moisture from hose 6 coming in contact with the inside walls of bumper 4. Although the preferred cross-sectional shape of tube 10 is square, it should be understood that the cross-sectional shape of tube 10 may be made to fit the inside of any RV bumper used for storing the RV sewage hose.

Figure 4:
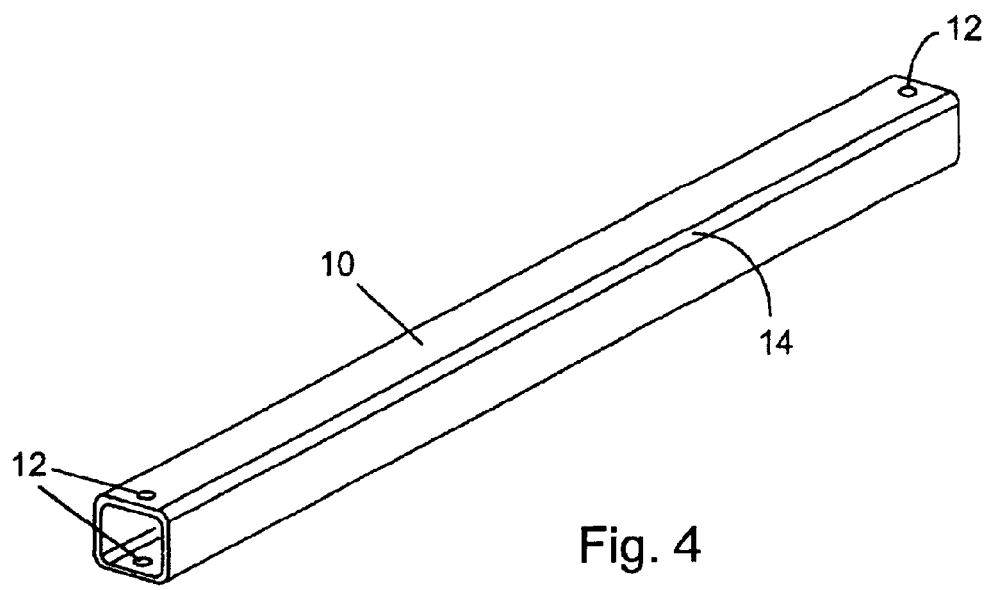
FIG. 4 is a perspective view of the present invention.

Turning now to FIG. 4, there is shown tube 10 of the present invention having a pair of optional through holes 12 at each end of tube 10. Holes 12 are sized to align with holes 5 in bumper 4. As previously described, tube 10 is made of a noncorrodable material and has a substantial portion of its outside surface without apertures, i.e. venting holes or drainage holes. The noncorrodable material should preferably have good weatherability and be capable of withstanding temperature extremes as is typical between summer and winter. The tube edge 14 preferably has a radius to provide a larger air gap between the inside corner edges of bumper 4 and tube edge 14 for ventilation. Any method of making tube 10 can be used including, but not limited to, assembling of component parts, casting, mold injection, and extrusion. Because tube 10 slides into bumper 4, tube 10 can also be easily withdrawn from bumper 4 to periodically inspect the integrity of tube 10. Should tube 10 begin to exhibit cracking or splitting due to the frictional contact between hose 6 and tube 10 that occurs when hose 6 is withdrawn for use or inserted for storage, the used cracked or split tube can be easily replaced with a new tube 10.

Using the present invention is relatively simple. One obtains a tube 10 that is longer or of equal length to the bumper in which it will be used. If tube 10 is longer, tube 10 may be cut to size. Once the proper length of tube 10 is obtained, tube 10 is then inserted into bumper 4 until the ends of tube 10 are aligned with or slightly recessed in bumper 4. After insertion, hose 6 may then be inserted into tube 10 for storage. Bumper end caps 8 may then be optionally attached to the ends of bumper 4. Tube 10 prevents water that is on the outside surface of hose 6 from coming in contact with the metal of the inside of bumper 4, which in turn helps prevent corrosion of bumper 4 from the inside.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A recreational vehicle bumper device for insertion into a recreational vehicle bumper, said device comprising an elongated tube substantially the same length as the bumper, said elongated tube having a substantially solid outside surface and an outside, cross-sectional shape sized smaller than the inside cross-sectional shape of said recreational vehicle bumper wherein said elongated tube fits inside said recreational vehicle bumper, and having an inside diameter sized large enough to receive and store a recreational vehicle's waste disposal hose.

2. The bumper device of claim 1 wherein said device is made of a noncorrodable material.

3. The bumper device of claim 2 wherein said noncorrodable material is a thermoset plastic, a thermoplastic or an elastomer.

4. The bumper device of claim 3 wherein said thermoset plastic is selected from the group consisting of polyurethane, polyester and epoxy.

5. The bumper device of claim 3 wherein said thermoplastic is selected from the group consisting of polyethylene, polypropylene, polyvinyl chloride, polystrene, acrylic, nylon, and fluorocarbon.

6. The bumper device of claim 3 wherein said thermoplastic is polyethylene.

7. The bumper device of claim 1 wherein said cross-sectional shape of said elongated tube is square or rectangular.

8. The bumper device of claim 7 wherein said square or rectangular shape has rounded corners.

9. The bumper device of claim 8 wherein said rounded corners have a radius of about one inch.

10. In combination, a recreational vehicle bumper device and a recreational vehicle, said combination comprising:

an elongated tube substantially the same length as the bumper, said elongated tube having a substantially solid outside surface and having an inside cross-sectional shape sized large enough to receive and store a recreational vehicle's waste disposal hose; and a recreational vehicle having a bumper configured for receiving and holding said elongated tube.

11. The combination of claim 10 wherein said elongated tube is made of a noncorrodable material.

12. The combination of claim 11 wherein said noncorrodable material is a thermoset plastic, a thermoplastic or an elastomer.

13. The combination of claim 12 wherein said thermoset plastic is selected from the group consisting of polyurethane, polyester, and epoxy.

14. The combination of claim 12 wherein said thermoplastic is selected from the group consisting of polyethylene, polypropylene, polyvinyl chloride, polystyrene, acrylic, nylon, and fluorocarbon.

15. The combination of claim 10 wherein said elongated tube has an outside cross-sectional shape that is square or rectangular.

16. The combination of claim 15 wherein said square or rectangular shape has rounded corners.

17. The combination of claim 16 wherein said rounded corners have a radius of about one inch.

18. A method of improving the useful life a recreational vehicle's bumper that is used to store a recreational vehicle sewage hose, said method comprising:

forming an elongated tube wherein said elongated tube is substantially the same length as the bumper, said elongated tube made of a noncorrodable material and having a substantially solid outside surface and an inside diameter sized to receive and store a recreational vehicle's sewage hose wherein said elongated tube fits into said recreational vehicle's bumper; and inserting said elongated tube into said recreational vehicle's bumper.

19. The bumper device of claim 1 wherein said elongated tube further includes at least one aperture in said outside surface adjacent an end of said elongated tube, said at least one aperture configured to align with an aperture in an outside surface of said recreational vehicle bumper adjacent an end of said bumper.

20. The combination of claim 10 wherein said elongated tube further includes at least one aperture in said outside surface adjacent an end of said elongated tube, said at least one aperture configured to align with an aperture in an outside surface of said recreational vehicle bumper adjacent an end of said bumper.

21. The method of claim 18 wherein said forming step further includes forming at least one aperture in said outside surface adjacent an end of said elongated tube, said at least one aperture configured to align with an aperture in an outside surface of said recreational vehicle bumper adjacent an end of said bumper.

* * * * *